United States Patent [19]
Bernstein et al.

[11] Patent Number: 6,078,848
[45] Date of Patent: *Jun. 20, 2000

[54] BROWSER KIOSK SYSTEM

[75] Inventors: Jason D. Bernstein, North Branford; Alexander D. Richardson, Old Lyme; Paul W. Blodgett, Haddam; Joseph P. McGuire, Orange, all of Conn.

[73] Assignee: Lexitech, Inc., Branford, Conn.

[*] Notice: This patent is subject to a terminal disclaimer.

[21] Appl. No.: 09/088,318

[22] Filed: Jun. 1, 1998

Related U.S. Application Data

[63] Continuation-in-part of application No. 08/706,988, Jul. 27, 1996, Pat. No. 5,761,071.

[51] Int. Cl.$^7$ .............................. G06F 17/00; G06F 7/00; G05B 7/00

[52] U.S. Cl. .......................... 700/237; 700/233; 700/236; 700/238; 707/101; 707/102

[58] Field of Search .................................. 395/20, 18, 22; 235/379, 380, 381; 340/706, 709; 700/236, 237, 233, 238; 707/100, 101, 102, 103, 104

[56] References Cited

U.S. PATENT DOCUMENTS

| | | | |
|---|---|---|---|
| 4,970,655 | 11/1990 | Winn et al. | 364/479 |
| 4,999,763 | 3/1991 | Ousborne | 364/140 |
| 5,088,586 | 2/1992 | Isobe et al. | 194/205 |
| 5,091,713 | 2/1992 | Horne et al. | 340/541 |
| 5,113,351 | 5/1992 | Bostic | 364/479 |
| 5,192,856 | 3/1993 | Counts | 235/375 |
| 5,243,174 | 9/1993 | Veeneman et al. | 235/381 |
| 5,349,658 | 9/1994 | O'Rourke et al. | 395/700 |
| 5,396,443 | 3/1995 | Mese et al. | 364/407 |
| 5,440,479 | 8/1995 | Hutton | 364/401 |
| 5,442,567 | 8/1995 | Small | 364/479 |
| 5,457,636 | 10/1995 | Sansone et al. | 364/478 |
| 5,524,201 | 6/1996 | Shwarts et al. | 395/161 |
| 5,533,123 | 7/1996 | Force et al. | 380/4 |
| 5,533,727 | 7/1996 | DeMar | 463/23 |

(List continued on next page.)

FOREIGN PATENT DOCUMENTS

| | | |
|---|---|---|
| 0 731 580 A1 | 11/1996 | European Pat. Off. . |
| 96/36163 | 11/1996 | WIPO . |

OTHER PUBLICATIONS

Web Page from Newmedia.com, Kiosks for the Web by Lydia Lee, dated Jul. 17, 1996.
Web Page, An Introduction to W3 Kiosk by Paolo Tosolini, dated Aug. 10, 1995.
Web Page, An Introduction to MM–WWW–PC, by Paolo Tosolini, dated Jun. 23, 1996.
Letter, Re: Overlay Technology conception from Colorado School of Mines, by George Funkey, dated Mar. 3, 1996.
E–Mail, to Asymetrix Corp. on "overlay" software technology by Dave Heyliger, dated May 19, 1996 (three pages).
E–Mail, Asymetrix on "Tool Book Functionality" by Raine Bergstrom, dated Jul. 23, 1996.
Newsletter from Colorado School of Mines "CSM News," dated Feb. 23, 1996 (two pages).

*Primary Examiner*—Paul P. Gordon
*Assistant Examiner*—Ramesh Patel
*Attorney, Agent, or Firm*—St. Onge Steward Johnston & Reens LLC

[57] ABSTRACT

The invention provides a self-service computer having a monitor which can access and display documents using browser software, and including software for providing at least one image which includes controls for the browser software. A microphone, speaker, camera and serial input device can be added to the kiosk to extend its functionality. The serial input device can be provided as a card swipe reader, a bar code reader, a smart card reader, a personal identification verifier and combinations of these. Examples of personal identification verifiers include palm print readers, retina scanners, voice analyzers, finger print scanners, DNA testers, and the like.

20 Claims, 4 Drawing Sheets

U.S. PATENT DOCUMENTS

| | | | |
|---|---|---|---|
| 5,534,857 | 7/1996 | Laing et al. | 340/835.36 |
| 5,537,315 | 7/1996 | Mitcham | 364/408 |
| 5,550,976 | 8/1996 | Henderson et al. | 395/200.06 |
| 5,551,030 | 8/1996 | Linden et al. | 395/600 |
| 5,555,408 | 9/1996 | Fujisawa et al. | 395/600 |
| 5,557,730 | 9/1996 | Frid-Nielsen | 395/159 |
| 5,559,728 | 9/1996 | Kowalaski et al. | 364/571.02 |
| 5,564,048 | 10/1996 | Eick et al. | 395/600 |
| 5,572,643 | 11/1996 | Judson | 395/793 |
| 5,572,984 | 11/1996 | Aiden et al. | 126/299 R |
| 5,602,905 | 2/1997 | Mettke | 379/96 |
| 5,615,346 | 3/1997 | Gerken | 395/341 |
| 5,761,071 | 6/1998 | Bernstein et al. | 364/479.07 |

BROWSER KIOSK SYSTEM

CROSS REFERENCE AND RELATED APPLICATION

This application is a continuation-in-part of Ser. No. 08/706,988 now U.S. Pat. No. 5,761,071 filed Jul. 27, 1996, and entitled "Browser Kiosk System", still pending.

FIELD OF THE INVENTION

The invention relates to self service browser and more specifically, to a device permitting users to access and display documents and electronic information in a user-friendly, tamper-resistant kiosk environment.

BACKGROUND OF THE INVENTION

A kiosk is essentially a self-service system, i.e., a computer system placed inside a box as illustrated in FIG. 1 or a desktop computer system for use in providing information and/or performing transactions (e.g., dispensing money as done by automated teller machines). A kiosk often employs a touch screen as the input device since touch screens are easy to use and immediately intuitive for almost all users; however, other types of pointing devices such as a mouse may also be used. With the advancements achieved by technology in recent years, the use of kiosks has become an economical and efficient alternative to the traditional form of providing interactive information and performing transactions; i.e., human-to-human interaction. Furthermore, kiosks are very effective in marketing and selling services and products since they may be programmed to provide information utilizing all of the resources available on multimedia; e.g., still graphics, sound, animations and full-motion video. This is why more and more government agencies and private business concerns are installing kiosks to better run and better market themselves. It has been estimated that by 1998, the number of kiosks installed in the United States will reach approximately 500,000 units.

Application programs exist which access and display many different types of electronic information, such as a text file, a graphics file, a sound file, a video file and a database item, to name a few. Accessing a file or a document using such software can be as simple as clicking a hyperlink (e.g., a highlighted word showing on a computer monitor screen) using a button on a mouse. A hyperlink, or simply link, is a way to "jump" from one document to another to which the link is connected.

For a kiosk system which is utilized by numerous users, providing access to the world wide web (the web) and/or any other location having browser-displayable documents via the existing graphical user interfaces (GUIs) of the various browsers is not desirable for the following reasons. First, the menu bar, the document title area, etc. not only detract from the appearance of the GUI, but the number of menu choices provided by existing browsers is unwieldy and unnecessary in a kiosk environment where a user is primarily interested in quickly obtaining pertinent information (as an example, Netscape Navigator 2.01 offers 66 menu choices). This is especially the case since many kiosks provide information via touch screens, where a simplified user-friendly interface with a select number of essential buttons is desired.

Second, the menu bar has menu choices which permit a user to alter the settings of the browser. In a kiosk system where uniformity and predictability of use is essential to achieving self-service, having menu choices which permit modification of the desired settings pose significant problems.

Third, a user can access and display any document accessible to the graphical browser, including documents which do not further the goal of the government agency or the business which has established the kiosk to provide interactive information pertaining to the government agency or the business.

And fourth, a user may perform a system function which is not desired by the kiosk provider. For example, a user of the browser running on Microsoft Windows platform may press Ctrl-Alt-Del keys to restart or crash the system. Unless prevented, the system may cease to function as a self-service kiosk device.

It would, therefore, be desirable to provide tamper-resistant, browser software which provides a visually pleasing, user-friendly, user interface suitable for use in a self-service kiosk.

SUMMARY OF THE INVENTION

Accordingly, it is an object of the invention to provide a self-service computer having a monitor which can access and display documents using browser software, and including software for providing at least one image which includes controls for the browser software.

Another object of the invention is to provide the self-service computer where the browser software is either an Active X control or Netscape source-code.

A further object of the invention is to provide the self-service computer where the browser software has access to the world wide web.

Yet another object of the invention is to provide a self-service computer of the above character which includes a microphone.

Yet a further object of the invention is to provide a self-service computer of the above character which includes a serial input device.

These and other objects are achieved by a self-service computer which includes a monitor, a microprocessor electrically coupled to the monitor for controlling what is displayed on the screen, browser software executable on the microprocessor for accessing and displaying documents on the monitor in response to user input, and at least one image positioned for display on the screen and permitting control of but resisting tampering with the browser software.

A microphone, speaker, camera and serial input device can be added to the kiosk to extend its functionality. The serial input device can be provided as a card swipe reader, a bar code reader, a smart card reader, a personal identification verifier and combinations of these. Examples of personal identification verifiers include palm print readers, retina scanners, voice analyzers, finger print scanners, DNA testers, and the like.

The self-service computer can also include a security control software which is programmed to disable operating system functions available to the user of the self-service computer to resist tampering with operation of the self-service computer.

The browser software, the image and the security control software can be remotely updated in a network setting.

The invention and its particular features and advantages will become more apparent from the following detailed description considered with reference to the accompanying drawings.

DETAILED DESCRIPTION OF THE INVENTION

Figure 1:
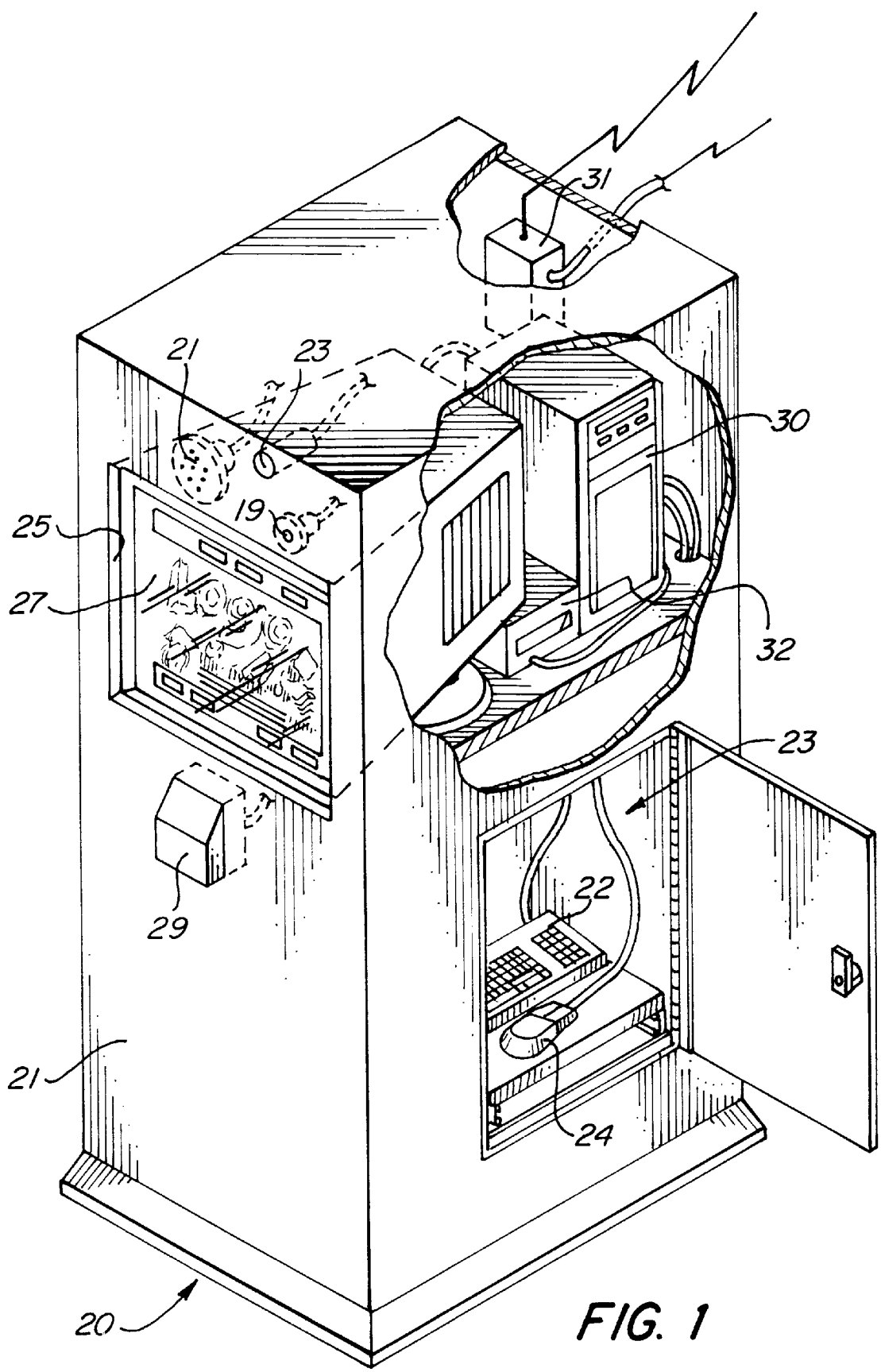
FIG. 1 shows a kiosk system of the present invention.

FIG. 1 shows one example of a kiosk system 20 of the present invention comprising a casing 21 with a storage compartment 23 which is normally inaccessible to users of the kiosk system 20 by means of a padlock or some other locking device (not shown). It is understood that a kiosk in accordance with the invention could also be provided as a desktop computer or some other self-service system. The storage compartment 23 stores a keyboard 22 and a mouse 24 which are used by the kiosk system 20 provider/operator to set the system settings.

The kiosk system 20 further comprises a monitor 25 having a display screen 27, a microprocessor 30 electrically coupled to the monitor 25 and memory 32. Memory 32, which may include RAM, ROM, fixed disk and/or other types of data storage, stores various programs for execution by the microprocessor 30, including browser software and an operating system. Note that the microprocessor 30 includes a telecommunication link and associated hardware, such as a modem, router or a network adapter 31. Telecommunication link may also be provided in a wireless manner; e.g., using an antenna and a cellular phone. Other hardware components of the kiosk system 20 include a microphone 19, a speaker 21, a camera 23 and a serial input device 29.

As shown in FIG. 1, the display screen 27 of the kiosk system 20 of the present invention is illustrated as a touch screen; however, it is understood that any user input or pointing device (e.g. mouse) will suffice, especially where kiosk 20 is a desktop computer not mounted within casing 21. After the keyboard 22 and the mouse 24 have been used by the kiosk system 20 provider/operator to set the system settings, they are locked in the storage compartment 23 so that users of the kiosk system 20 cannot use the keyboard 22 and the mouse 24 to tamper with the system settings. In desktop computer kiosk systems where the keyboard 22 and the mouse 24 are accessible to users, security control software discussed below is utilized to render the browser software tamper-resistant for reliable self-service. Even without the keyboard 22 and the mouse 24, users can interact with the kiosk system 20 by touching appropriate selections showing on the touch screen. Furthermore, it is also possible to provide the keyboard 22 and/or the mouse 24 along with the touch screen. These different possibilities will be described in more detail hereinbelow.

Figure 2:
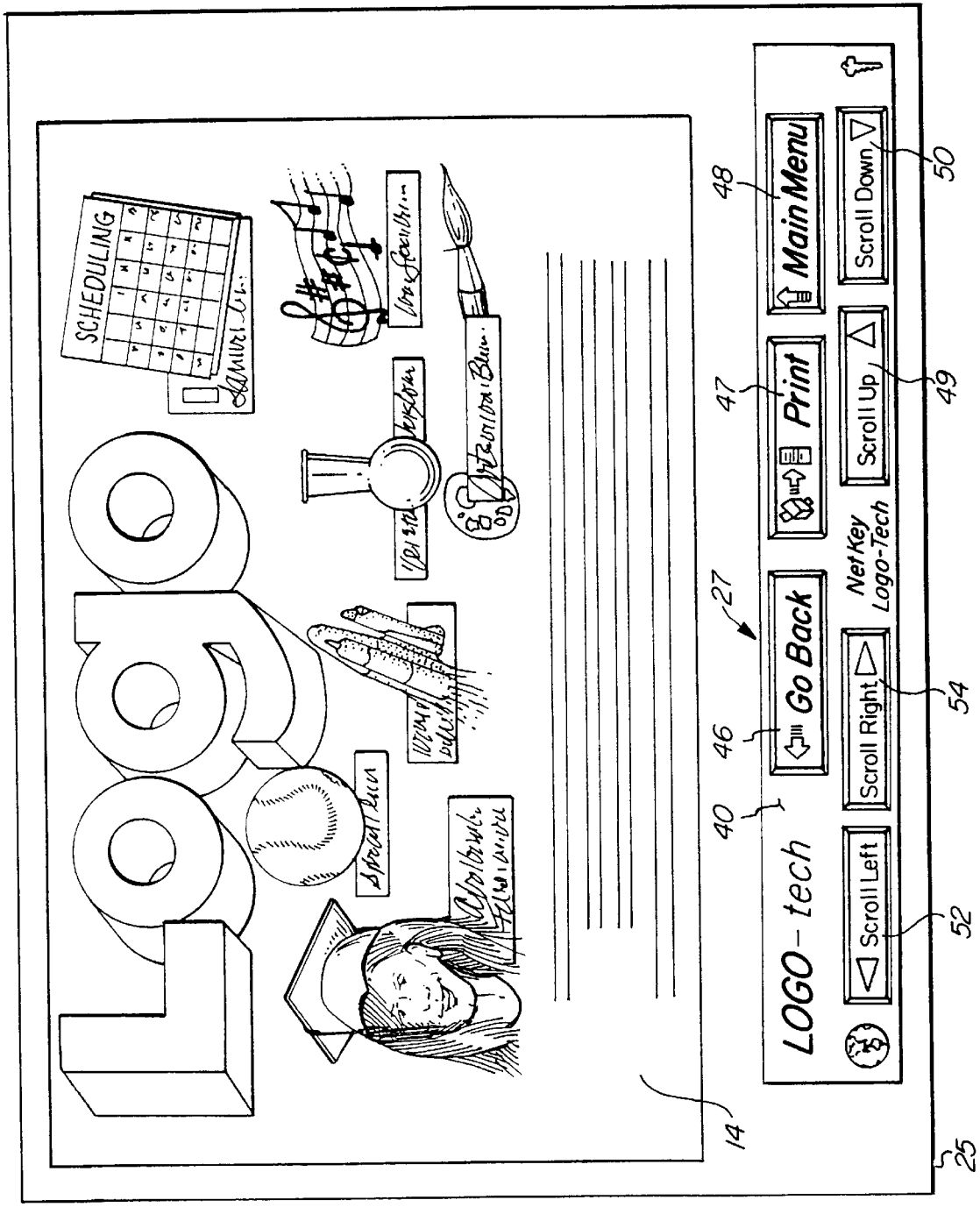
FIG. 2 shows the monitor of the kiosk of FIG. 1 having a first window for displaying accessed documents and an image including browser controls.

In FIG. 2, a screen display from monitor 25 is shown. A document viewing window 14 is generated by the browser software for display of accessed software. At least a first image 40 shown as a separate window includes controls for operating the browser software. It is understood that image 40 may overlap some or none of document viewing window 14.

By "browser software" is meant any program for accessing and displaying documents or files. Browser software may include, but is not limited to Netscape source code and Active X controls.

Figure 3:
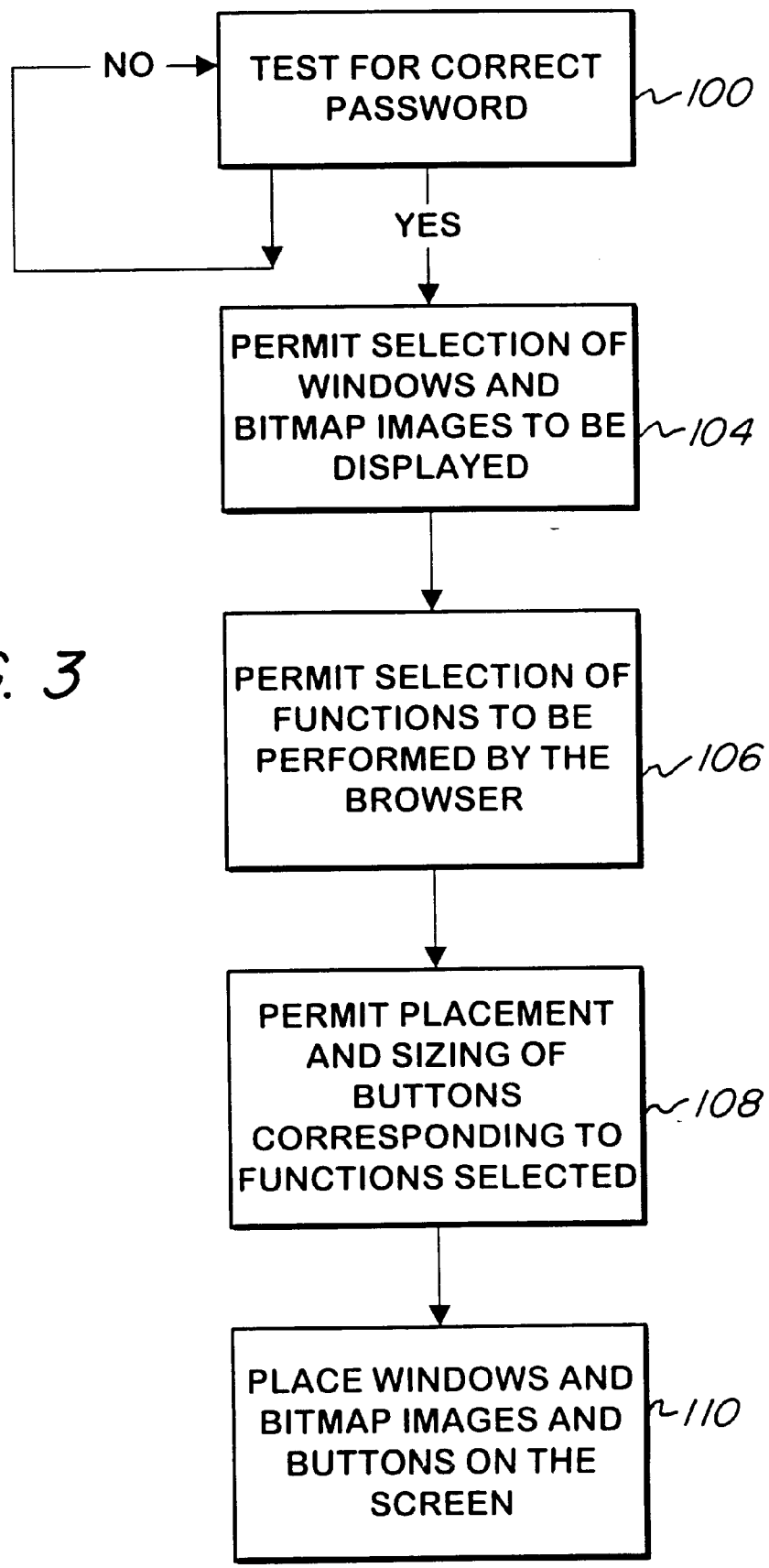
FIG. 3 is a flowchart showing the operation of a GUI control software in the kiosk of FIG. 1.

Image 40 has a Go Back button image 46, a Print button image 47, a Main Menu button image 48, a Scroll Up button image 49, a Scroll Down button image 50, a Scroll Left button image 52 and a Scroll Right button image 54. As will be described hereinbelow, the selection of these button images, along with the size and placement (on the touch screen 27), are specified by the provider/operator of the kiosk system 20. Furthermore, other than the Main Menu function (which simply returns the system 20 to the main menu page), the function corresponding to each button image is that which can be recognized and performed by the browser software. In terms of the operation of these button images on the touch screen 27, there is employed an enhanced mouse driver which permits the microprocessor 30 in conjunction with the touch screen 27 to detect whether the user of the kiosk system 20 has touched one of the button images 46, 47, 48, 49, 50, 52 or 54. Depending upon the button image touched (other than Main Menu 48), the browser is instructed by the GUI control software to perform the corresponding function. Since the operation of the enhanced mouse driver for a touch screen is known in the art, no further description about this will be undertaken herein. The operation of the GUI control software is illustrated in the flowchart of FIG. 3.

In block 100, a test is conducted to see if the correct password has been entered for accessing the GUI control software. This test is conducted by an appropriate daemon, which as known, is a background process which spends most of the time "sleeping" until there is a triggering action that requires the daemon to carry out a specific task. If the correct password has been entered, the kiosk system 20 provider/operator is permitted to select the windows and bitmap image 40 to be displayed on the touch screen 27 in block 104. The provider/operator of the kiosk system 20 is further permitted in block 106 to select functions to be performed by the browser. The functions available for selection are each stored in memory 32 as part of a predetermined set of functions capable of being recognized and performed by the browser (can therefore include all the menu choices available from the menu bar 2). For example, for Netscape Navigator, the kiosk system provider/operator may select the Bookmarks function in block 106. Each function selected in block 106 is represented on the touch screen 27 as a button image.

The placement and size of each button on the GUI is left to the kiosk system provider/operator in block 108, the placement and size being specified either by providing bitmap coordinates or by window resizing and dragging techniques familiar to Macintosh and Windows users. Finally, in block 110, the window and bitmap images selected to be displayed in block 104, as well as the buttons from block 108, are positioned and displayed on the touch screen 27.

Figure 4:
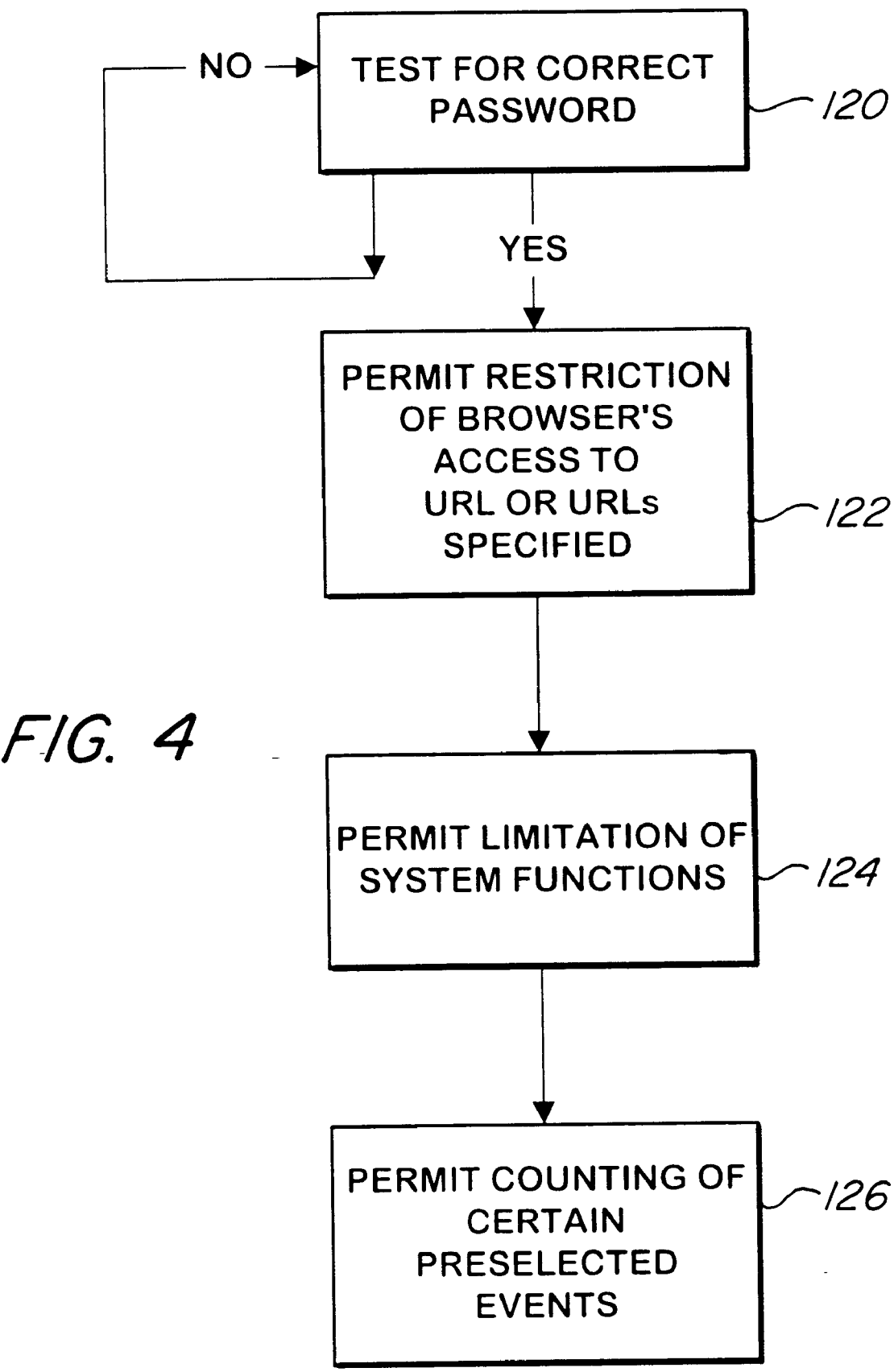
FIG. 4 is a flowchart showing the operation of a security control software in the kiosk of FIG. 1.

The GUI control software is stored in memory 32. A security control software module may be an enhancement to or a separate program from the GUI control software. The security control software, which is also stored in memory 32, permits the kiosk system 20 provider/operator to limit access of the browser to uniform resource locators (URLs) specified by the provider. Furthermore, in another embodiment of the kiosk system where the keyboard 22 and/or the mouse 24 are provided for use by the kiosk user, the security control software also permits the kiosk system provider/operator to limit the system functions available to the user. The complete operation of the security control software is illustrated in the flowchart of FIG. 4.

In block 120, a test is conducted to see if the correct password has been entered for accessing the security control software. This test is similar to the test conducted by the appropriate daemon in block 100. In fact, if the security control software is part of the GUI control software, then the same password may access both software modules. If the correct password has been entered, the security control software is then accessed and in block 122, the kiosk system 20 provider/operator is given the option of restricting the browser's access to URL or URLs specified by the provider/operator. If the provider/operator of the kiosk system 20 has specified the URLs accessible to the browser, these URLs are stored in memory 32. The browser may be limited to these specified URLs by, for example, listing the URLs under a button for Bookmarks/Favorites in currently available commercial browsers.

In block 124, the provider of the kiosk system is given the option of limiting the operating system functions (e.g., Window resizing) available to the user of the kiosk system. This is done by providing a predetermined set of operating system functions from which the kiosk system provider can select those system functions to be disabled. Finally, in block 126, the kiosk system provider is given the option of counting the occurrence of certain preselected events, such as starting the browser, printing a document, accessing a particular URL, etc. Logging this data may be desired for marketing reasons, gauging the effectiveness of the interactive information provided by the kiosk system 20, or some other reason. The collected data is stored in memory 32.

Once the settings for the browser kiosk system software, an example of which was developed by the inventors and is currently available commercially as NetKey™ have been set, then the kiosk system 20 of the present invention is ready for use by the public. The GUI control software settings, the security control software settings and the browser settings of the kiosk system 20 may be remotely modified. For example, if the kiosk system 20 is connected to a transmission control protocol/internet protocol (TCP/IP) network, remote modification can be performed using file transfer protocol (FTP). FTP server software executing on the microprocessor 30, which may be an additional module of the NetKey™ software, and FTP client software running on a remote computer can be used to transfer files from the remote host over a network to the kiosk system 20. As another example, if kiosk 20 is connected to the Microsoft network, the kiosk hard drive may be shared with an administrator enabling remote updates. In either case, the update is made by closing the executable and replacing it with a new version having different settings and/or by replacing an .ini file or the like associated with the executable to be modified.

A suspend daemon, which may be provided as an enhancement to NetKey™, running in the background shuts down the GUI control software and/or the security control software and/or the browser software when a SUSPEND file is copied to a specified directory on the kiosk system 20. After settings for the GUI control software and/or the security control software and/or the browser software have been modified by copying over the executable with new settings, a restart daemon running in the background starts the modified software when a RESTART file is copied to a specified directory on the kiosk system 20.

Note that an attract loop stored in memory 32 and executable by the NetKey™ software may be provided to enhance the features of the kiosk system 20. An attract loop is simply a graphic or video which is utilized to draw people to the kiosk system 20 or to keep a user of a kiosk "attracted" to the screen. The appearance of the attract loop on the display screen 27 is preferably controlled by the time-out function, such that when there is no user input for a specified period of time, the attract loop appears on the screen 27.

Although the invention has been described with reference to a particular arrangement of parts, features and the like, these are not intended to exhaust all possible arrangements or features, and indeed many other modifications and variations will be ascertainable to those of skill in the art.

What is claimed is:

1. A self service computer, comprising:
    a monitor;
    a microprocessor coupled to said monitor for controlling what is displayed on said monitor;
    software executable on said microprocessor for generating a document viewing window on said monitor, and for accessing and displaying a plurality of documents in the viewing window in response to user input, said software capable of performing a plurality of functions with respect to the plurality of documents; and
    software executable on said microprocessor for displaying at least one image on said screen so as to provide navigational controls for at least one authorized function of said accessing and displaying software with respect to the plurality of documents, but without also permitting tampering with said accessing and displaying software by not displaying images providing controls for unauthorized functions with respect to the plurality of documents.

2. The self-service computer of claim 1, wherein said accessing and displaying software is an Active X control.

3. The self-service computer of claim 1, wherein said monitor is a touch screen and wherein said image includes buttons selectable via said screen for initiating accessing and displaying software functions.

4. The self-service computer of claim 1, further comprising GUI control software executable on said microprocessor to generate said image.

5. The self-service computer of claim 1, further comprising file transfer protocol (FTP) server software executable on said microprocessor for remotely updating said GUI control software and/or said accessing and displaying software.

6. The self-service computer of claim 5, further comprising a first daemon running on said microprocessor which shuts down said GUI control software and/or said accessing and displaying software when a SUSPEND file is copied to a specified directory on the self-service computer.

7. The self-service computer of claim 5, further comprising a second daemon running on said microprocessor which starts said GUI control software and/or said accessing and displaying software when a RESTART file is copied to a specified directory on the self-service computer.

8. The self-service computer of claim 1, further comprising an attract loop which appears on said monitor when there has been no user input for a predetermined period of time.

9. The self-service computer of claim 1, wherein said accessing and displaying software is Netscape source code.

10. A self-service computer, comprising:
    a monitor;
    a microprocessor coupled to said monitor for controlling what is displayed on said monitor;
    software executable on said microprocessor for generating a document viewing window on said monitor, and for accessing and displaying a plurality of documents in the viewing window in response to user input, said software capable of performing a plurality of functions with respect to the plurality of documents;

software executable on said microprocessor for displaying at least one image on said screen so as to provide navigational controls for at least one authorized function of said accessing and displaying software with respect to the plurality of documents, but without also permitting tampering with said accessing and displaying software by not displaying images providing controls for unauthorized functions with respect to the plurality of documents; and a microphone.

11. The self-service computer of claim 10, including a speaker.

12. The self-service computer of claim 11, including a camera.

13. The self-service computer of claim 10, wherein said accessing and displaying software is an Active X control.

14. The self-service computer of claim 10, wherein said monitor is a touch screen and wherein said image includes buttons selectable via said screen for initiating accessing and displaying software functions.

15. The self-service computer of claim 10, wherein said accessing and displaying software is Netscape source code.

16. A self service computer, comprising:

a monitor;

a microprocessor coupled to said monitor for controlling what is displayed on said monitor;

software executable on said microprocessor for generating a document viewing window on said monitor, and for accessing and displaying a plurality of documents in the viewing window in response to user input, said software capable of performing a plurality of functions with respect to the plurality of documents;

software executable on said microprocessor for displaying at least one image on said screen so as to provide navigational controls for at least one authorized function of said accessing and displaying software with respect to the plurality of documents, but without also permitting tampering with said accessing and displaying software by not displaying images providing controls for unauthorized functions with respect to the plurality of documents; and a serial input device.

17. The self-service computer of claim 16, wherein said serial input device is selected from the group comprising a card swipe reader, a bar code reader, a smart card reader, a personal identification verifier, and combinations of these.

18. The self-service computer of claim 16, wherein said accessing and displaying software is an Active X control.

19. The self-service computer of claim 16, wherein said monitor is a touch screen and wherein said image includes buttons selectable via said screen for initiating accessing and displaying software functions.

20. The self-service computer of claim 16, wherein said accessing and displaying software is Netscape source code.

* * * * *